June 11, 1957  A. S. WILLIAMS  2,795,188
ADJUSTING MEANS FOR PRINTING PRESS ROLLERS
Filed Oct. 2, 1953
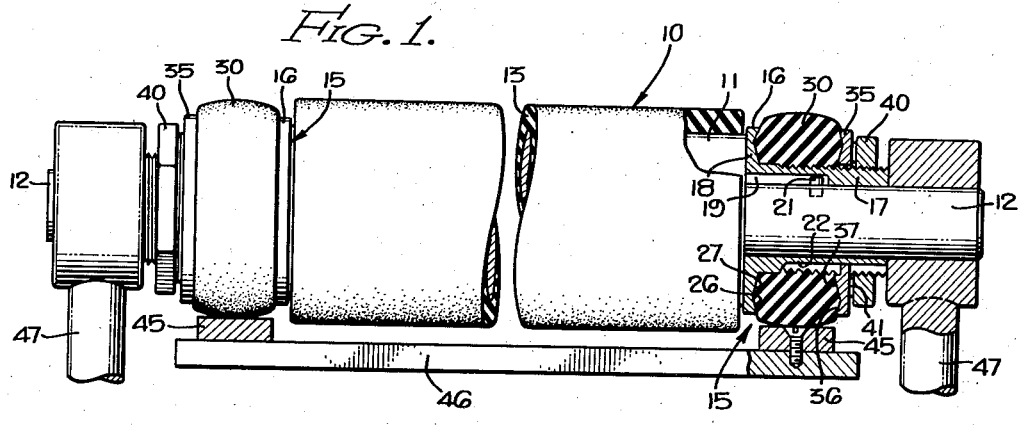
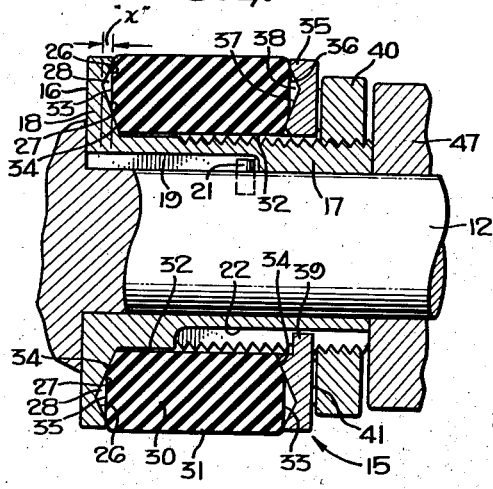
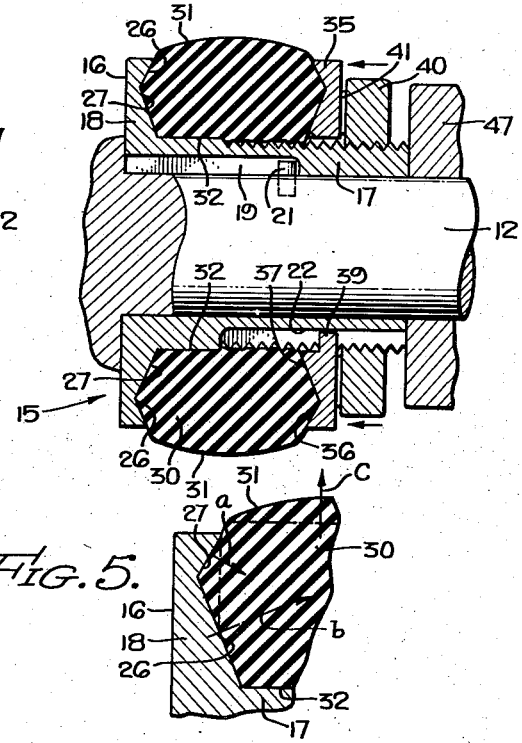
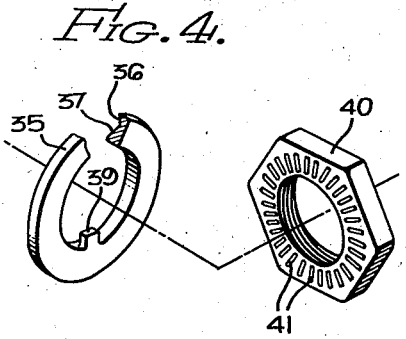
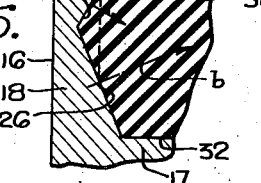
AMY S. WILLIAMS,
INVENTOR.
BY
ATTORNEY

United States Patent Office 2,795,188
Patented June 11, 1957

2,795,188
ADJUSTING MEANS FOR PRINTING PRESS ROLLERS

Amy S. Williams, North Hollywood, Calif., assignor to Cowan Pressroom Products, Inc., Hollywood, Calif., a corporation of California Application October 2, 1953, Serial No. 383,872

3 Claims. (Cl. 101—348)

The present invention relates to printing press supporting rollers and particularly to trucks by which such rollers are movably supported. More specifically the invention comprises an improved manually adjustable supporting truck for a printing press roller constructed and designed to prevent flange overhang and to provide longer life, the construction comprising an improvement in the constructions disclosed in earlier United States Letters Patent 1,240,078 and 2,066,031.

The conventional inking roller for printing presses is movably mounted for displacement by means of supports or trucks at its opposite ends which travel upon tracks. In a preferred form these trucks include resilient rings or tires making contact with tracks and which are clamped in place by means the adjustment of which varies the effective diameters of the tires and so the height at which the inking roller is supported relative to the work surface. Heretofore difficulty has been encountered in that the clamping means did not prevent the tires from being forced over the rims of the end walls or flanges of the compressing element. The tire body so displaced laterally is ineffective to vary the tire diameter and the loss of this body volume is a factor in decreased tire life, for the overhang tends to increase with use and the application of greater force. The truck comprising the present invention is so constructed that the overhang of the tire is minimized with the result that a maximum volume of tire body is available for radial displacement providing more efficient use of the tire and increased life.

It is an object of the present invention to provide a truck for printing press rollers in which overhang of the tire over the rim of the clamping walls of the truck is minimized and tire life is increased.

Another object of the invention is to provide an improved truck or supporting member for printing press inking rollers so constructed as to apply the internal compressive forces upon the resilient tire in a manner to provide a maximum range of tire diameters.

These and other more specific objects will appear upon a reading of the following specification and claims and upon a consideration of the accompanying drawing.

Referring now to the drawing in which a preferred embodiment of the invention is illustrated:

Figure 1 is an elevational view of an operative inking roller embodying trucks constructed in accordance with the present invention one of which is shown in section;

Figure 2 is an enlarged section through a supporting truck of the type embodied in the construction of Figure 1 showing the relationship prior to the adjustment of the truck into tire-expanded operative relationship;

Figure 3 is a view similar to Figure 2 but with the truck adjusted to expand the tire into operative relationship;

Figure 4 is a view showing a longitudinally adjustable clamping collar and the cooperating nut by which it is adjusted; and Figure 5 is a partial section through one end of the truck showing the expansion of the tire into the recesses of its supporting member to eliminate overhang and also illustrating the radial expansion of the tire itself.

Referring again to the drawing, the reference character 10 indicates generally a printing press roller which includes a cylindrical core 11 having integral stub shafts 12 at its opposite ends and which is enclosed by a covering 13 of suitable material which may be gelatinous. Each of the stub shafts 12 is keyed to and supported by a truck, indicated generally by the reference character 15, comprising in each instance a tubular supporting member 16 having a cylindrical sleeve 17 which seats upon the stub shaft 12 and is formed at its inner end with a radial wall or flange 18 which abuts the adjacent end face of cylinder core 11. The opposite outwardly facing side of flange 18 is contoured in a particular manner as will be described. Each sleeve 17 of support element 16 is exteriorly threaded and provided with an interior groove 19 extending longitudinally from its inner end and seating a pin 21 carried by its supporting stub shaft 12 to prevent relative rotation. The tubular body or sleeve 17 is also exteriorly slotted or grooved at 22, the slot extending inwardly from the outer end of the body. The outer face of wall or flange 18 of the supporting member 16 is formed by two oppositely sloping or beveled surfaces 26 and 27, which form a recess or pocket 28 which will be left unfilled when an uncompressed tire is positioned in abutting contact with the wall 18 and makes contact therewith upon both surfaces 26 and 27. This space unfilled before the compression of the tire is illustrated most clearly in Figure 2.

Encircling the support member 16, and more specifically the tubular sleeve 17 thereof, is a resilient ring or tire indicated generally by the reference character 30. The tire is shown as initially positioned and before compression in Figure 2 while in the other figures of the drawings it is illustrated in its compressed operative relationship. Ring 30 is preferably formed of rubber, either natural or synthetic, and in its uncompressed initial condition, illustrated in Figure 2, has a smooth cylindrical outer surface 31, a smooth cylindrical inner surface 32, and at each of its ends an end wall 33. The latter is beveled or tapered at 34 adjacent the inner wall 32 so that it lies flat against the sloping wall 27 of the end flange 17 of the support element 16. With the ring so positioned, and before compression, the radial wall 33 of the tire makes abutting contact with the outer edge of the sloping wall 26 of flange 17, the pocket 28 being present between the ring and the flange as illustrated in Figure 2.

Referring again particularly to Figure 2, it is seen that the end of ring 30 spaced from the flange 17 is abutted by a collar indicated generally by the reference character 35. Collar 35 includes a lug 39 extended into the groove 22 of sleeve 17 to prevent relative rotation. The side of collar 35 facing the adjacent end of tire 30 is contoured so as to duplicate the tire-contacting face of flange 18, that is, is formed by inner and outer radial sloping surfaces 36 and 37 which between themselves and the uncompressed ring 30 form a pocket or recess 38.

Tire 30 is adapted to be compressed longitudinally of the roller axis between the flange 18 of support member 16 and collar 35 by the longitudinal movement of the collar toward the flange. Rotation of the collar relative to member 16 is prevented by the extension of its integral lug 39 into the groove 22. A nut 40 is interiorly threaded to conform and seat upon the threads of the sleeve portion 17 and abut the collar 35, its face adjacent the collar being formed with a plurality of radially extending ridges or shoulders 41 which provide increased resistance to relative rotation preventing unintentional loosening of the nut.

Referring now to Figures 1 and 3 in particular, tire 30 is shown in its radially expanded relationship, having been expanded radially by the compression resulting from the lateral displacement of the collar 35 toward flange 18 under force applied upon the rotation of nut 40. This compressing action has effected the displacement or bulging of the sides or ends of the tire 30 into the pockets 28 and 38, the lateral displacement in each instance being equal to the distance "X" indicated in Figure 2. The contact of the sloping beveled walls of flange 18 and collar 35 with the abutting surfaces of the tire transmits forces into the tire as illustrated by the arrows "a" and "b" in Figure 5. The longitudinal components of these forces applied at the opposite sides of the tire mutually cancel leaving only a resultant force component "c." This resultant force has displaced the originally smooth cylindrical surface 31 of the tire (see Figure 2) radially outwardly into a convex curvature, as illustrated in Figures 1, 3 and 5, increasing the effective tire diameter. The pockets 28 and 38 have accommodated a portion of the tire body at its ends resulting in a relationship in which the extremities of the tire are displaced radially to a greatly decreased degree, as compared to the central portion of the tire. This is extremely desirable as it reduces the tire body available to be forced over the outer rims of the flange 16 and collar 35. Following wear further tightening of the nut 40 will result in greater compression of the ring 30 and further radial expansion to compensate for wear.

Referring particularly to Figure 1, the operative relationship of the supporting trucks 15 and the roller 10 is illustrated and it is seen that the roller is supported by the trucks which travel upon tracks 45 on a frame 46. Arms 47 at the end of the roller stub shafts 12 and outside the trucks 15 provide the propelling force by which the entire assembly is displaced, the trucks 15, and specifically the tires 30 thereof, rolling upon the tracks.

The truck will normally be assembled prior to being positioned upon its stub shaft 12. Subsequently, and whenever it is desired to vary the height of the roller 10 above the surface of the frame 46, it will not be necessary to remove the truck in order to vary the diameter of the tire to effect the raising or lowering of the roller. Manual rotation of the nut 40 to increase or to decrease the force of compression acting on the tire involved will produce the desired result.

While the particular apparatus herein shown and described in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. In a printing press inking roller of the type comprising an elongated cylinder having stub shafts at its ends, a truck rotatably and adjustably supporting said cylinder comprising a support member including a sleeve keyed to one of said stub shafts and formed at its end adjacent said cylinder with a flange having a tire-contacting face formed of reentrant inner and outer sloping surfaces forming between them a recess, said inner reentrant surface being generally frusto-conical and converging away from said cylinder, said outer reentrant surface being generally frusto-conical and converging toward said cylinder, a resilient tire positioned upon said support member and abutting said flange, said tire having identical ends and being formed with a beveled end surface abutting the inner sloping surface of said flange and with a radial end surface making contact with the outer extremity of said outer sloping surface of said flange, a collar abutting the opposite end of said tire and having a face adjacent said tire shaped similarly to the tire-contacting face of said flange, said flange and said collar cooperating with said tire to form interior pockets into which said tire may be expanded upon the exertion of a compression force by the longitudinal movement of said collar toward said flange, and a nut element threadedly engaging said sleeve of said supporting element to force said collar toward said flange to effect the filling of said pockets and the radial displacement of the outer circumferential surface of said tire at its center, characterized in that said outer circumferential tire surface prior to said radial displacement thereof was substantially the same diameter as the outer diameters of said flange and collar.

2. The construction recited in claim 1 characterized in that the volume of said interior pockets is sufficiently great as to effectively reduce the radial expansion of said tire at its ends throughout the adjustment range of said nut.

3. A supporting truck for a press inking roller comprising a tubular cylindrical sleeve adapted to seat upon a roller shaft having a radially extending flange at one end adapted to abut the end wall of the roller and formed upon its side spaced from said roller with inner and outer beveled wall surfaces forming an interior recess, said inner surface converging away from said roller, said outer surface converging toward said roller, a collar slidably seated upon said sleeve for longitudinal displacement thereon and keyed thereto to prevent relative rotation, a resilient ring-like tire encircling said sleeve between said flange and said collar and formed at its end adjacent said flange with a surface lying flat against said inner beveled surface, said tire also being formed with a radially extending surface extended between said inner beveled surface and the outer extremity of the outer beveled surface of said flange and across said interior recess, and a rotatable nut element threadedly seated upon said tubular sleeve to force said collar toward said flange in order to compress said tire and expand it into said interior recess in said flange and radially outwardly between said flange and said collar to increase its effective diameter, characterized in that said tire prior to said expansion thereof has a cylindrical outer surface of substantially the said diameter as the outer diameters of said flange and collar.

References Cited in the file of this patent

UNITED STATES PATENTS

| | | |
|---|---|---|
| 528,726 | Hyde | Nov. 6, 1894 |
| 2,066,031 | Cowan | Dec. 29, 1936 |
| 2,134,475 | Green | Oct. 25, 1938 |
| 2,562,627 | McKay | July 31, 1951 |
| 2,613,598 | McKay | Oct. 14, 1952 |
| 2,644,610 | Work | July 7, 1953 |